US010029306B2

(12) United States Patent
Voglewede et al.

(10) Patent No.: US 10,029,306 B2
(45) Date of Patent: Jul. 24, 2018

(54) MESH REINFORCEMENT FOR METAL-MATRIX COMPOSITE TOOLS

(71) Applicant: Halliburton Energy Services, Inc., Houston, TX (US)

(72) Inventors: Daniel Brendan Voglewede, Spring, TX (US); Grant O. Cook, III, Spring, TX (US); Garrett T. Olsen, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 280 days.

(21) Appl. No.: 14/905,427

(22) PCT Filed: Mar. 19, 2015

(86) PCT No.: PCT/US2015/021540
§ 371 (c)(1),
(2) Date: Jan. 15, 2016

(87) PCT Pub. No.: WO2016/148724
PCT Pub. Date: Sep. 22, 2016

(65) Prior Publication Data
US 2017/0100771 A1    Apr. 13, 2017

(51) Int. Cl.
*B22D 19/14* (2006.01)
*B22D 19/02* (2006.01)
*B22D 25/02* (2006.01)
*B22C 9/22* (2006.01)
*E21B 10/42* (2006.01)

(52) U.S. Cl.
CPC ............. *B22D 19/14* (2013.01); *B22C 9/22* (2013.01); *B22D 19/02* (2013.01); *B22D 25/02* (2013.01); *E21B 10/42* (2013.01)

(58) Field of Classification Search
CPC .. B22C 9/08; B22C 9/10; B22C 9/106; B22C 9/22; B22C 9/24; B22D 19/02; B22D 19/14; B22D 23/06; B22D 25/02
USPC ...... 164/91, 97, 271, 332, 333, 334, 80, 302
See application file for complete search history.

(56) References Cited

U.S. PATENT DOCUMENTS

| 4,667,756 A | 5/1987 | King et al. |
| 4,721,598 A | 1/1988 | Lee |
| 6,089,123 A | 7/2000 | Chow et al. |

(Continued)

FOREIGN PATENT DOCUMENTS

| CA | 1287343 C | 8/1991 |
| EP | 1923476 A2 | 5/2008 |
| WO | 2013180695 A1 | 12/2013 |

OTHER PUBLICATIONS

International Search Report and Written Opinion for PCT/US2015/021540 dated Dec. 18, 2015.

*Primary Examiner* — Kevin P Kerns
(74) *Attorney, Agent, or Firm* — McDermott Will & Emery LLP

(57) ABSTRACT

A mold assembly system includes a mold assembly that defines an infiltration chamber used for forming an infiltrated metal-matrix composite (MMC) tool. Reinforcement materials are deposited within the infiltration chamber, and a binder material is used to infiltrate the reinforcement materials. At least one preformed mesh is positioned within the infiltration chamber and embedded within the reinforcement materials. The at least one preformed mesh includes a porous body and provides skeletal reinforcement to the infiltrated MMC tool following infiltration.

26 Claims, 7 Drawing Sheets

(56) References Cited

U.S. PATENT DOCUMENTS

2008/0208353 A1 8/2008 Kumar et al.
2011/0107586 A1 5/2011 Choe et al.

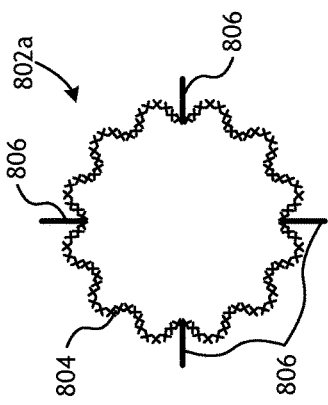
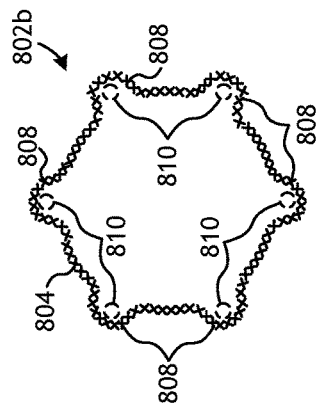
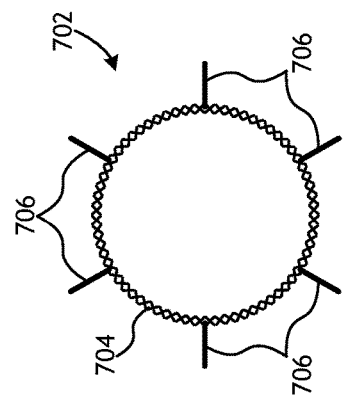
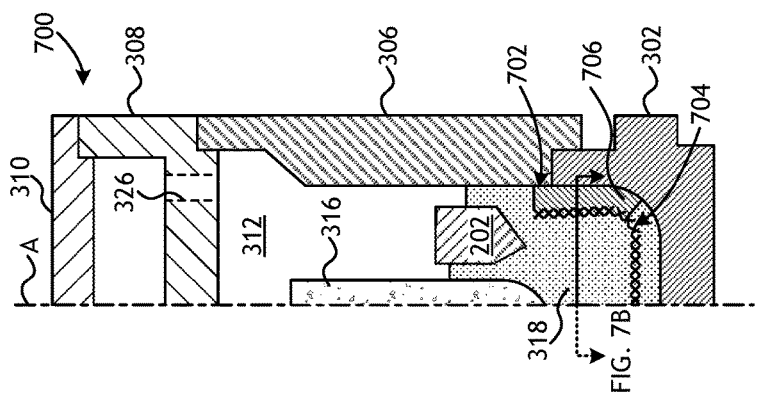

MESH REINFORCEMENT FOR METAL-MATRIX COMPOSITE TOOLS

This application is the national stage application of PCT Patent Application No. PCT/US2015/021540 by Daniel Brendan Voglewede, filed on Mar. 19, 2015, entitled Mesh Reinforcement for Metal-Matrix Composite Tools.

BACKGROUND

Metal-matrix composite (MMC) tools are typically manufactured by placing loose powder reinforcing material into a mold and infiltrating the powder material with a binder material, such as a metallic alloy. The various features of the resulting MMC tool may be provided by shaping the mold cavity and/or by positioning temporary displacement materials within interior portions of the mold cavity. A quantity of the reinforcement material may then be placed within the mold cavity with a quantity of the binder material. The mold is then placed within a furnace and the temperature of the mold is increased to a desired temperature to allow the binder (e.g., metallic alloy) to liquefy and infiltrate the matrix reinforcement material.

A wide variety of MMC tools are commonly used in the oil and gas industry for forming wellbores, in completing wellbores that have been drilled, and in producing hydrocarbons such as oil and gas from completed wells. Examples of such tools include cutting tools, such as drill bits, reamers, stabilizers, and coring bits; drilling tools, such as rotary steerable devices and mud motors; and other downhole tools, such as window mills, packers, tool joints, and other wear-prone tools.

MMC drill bits used in the oil and gas industry are constantly exposed to varying downhole conditions affected by mud pressure, the type of formation being penetrated, the weight-on-bit, and torque. These continually fluctuating variables can result in conditions where the MMC drill bit is irreparably damaged, such as in the case of blade breakage, which can cost the drilling company and the bit provider significant time and money. When blades in MMC drill bits break, they tend to break in similar locations and are usually lost due to high torque and/or high weight-on-bit.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 7A and 7B depict another exemplary mold assembly that includes another exemplary preformed mesh.

FIGS. 8A and 8B depict cross-sectional top views of exemplary preformed meshes that may be used in any of the mold assemblies described herein.

DETAILED DESCRIPTION

The present disclosure relates to tool manufacturing and, more particularly, to metal-matrix composite tools that include a preformed mesh positioned within the body of the metal-matrix composite tool and operating to arrest crack propagation during operation, and associated methods of production and use related thereto.

The embodiments described herein may be used to fabricate infiltrated metal-matrix composite tools that are reinforced using one or more preformed meshes. The preformed mesh(es) may be selectively positioned within an infiltration chamber used to fabricate the metal-matrix composite tool and embedded within reinforcement materials. Following infiltration of a liquefied binder material, the preformed mesh(es) may serve as a skeletal reinforcement to the body of the metal-matrix composite tool. In some cases, for instance, the preformed mesh(es) may arrest crack propagation in a manner similar to what rebar preforms do in reinforced concrete. Beyond providing increased toughness and/or resistance to crack propagation, however, the preformed mesh(es) may allow for the use of lower-strength (and potentially lower-cost) binder materials and/or reinforcement materials to achieve the same macroscopic strength in the metal-matrix composite tool.

The embodiments of the present disclosure are applicable to any tool or device formed as a metal-matrix composite (MMC). Such tools or devices are referred to herein as "MMC tools" and may or may not be used in the oil and gas industry. For purposes of explanation and description only, however, the following description is related to MMC tools that can be used in the oil and gas industry, such as drill bits, but it will be appreciated that the principles of the present disclosure are equally applicable to any type of MMC used in any industry or field, such as armor plating, automotive components (e.g., sleeves, cylinder liners, driveshafts, exhaust valves, brake rotors), bicycle frames, brake fins, aerospace components (e.g., landing-gear components, structural tubes, struts, shafts, links, ducts, waveguides, guide vanes, rotor-blade sleeves, ventral fins, actuators, exhaust structures, cases, frames), and turbopump components, without departing from the scope of the disclosure.

Figure 1:
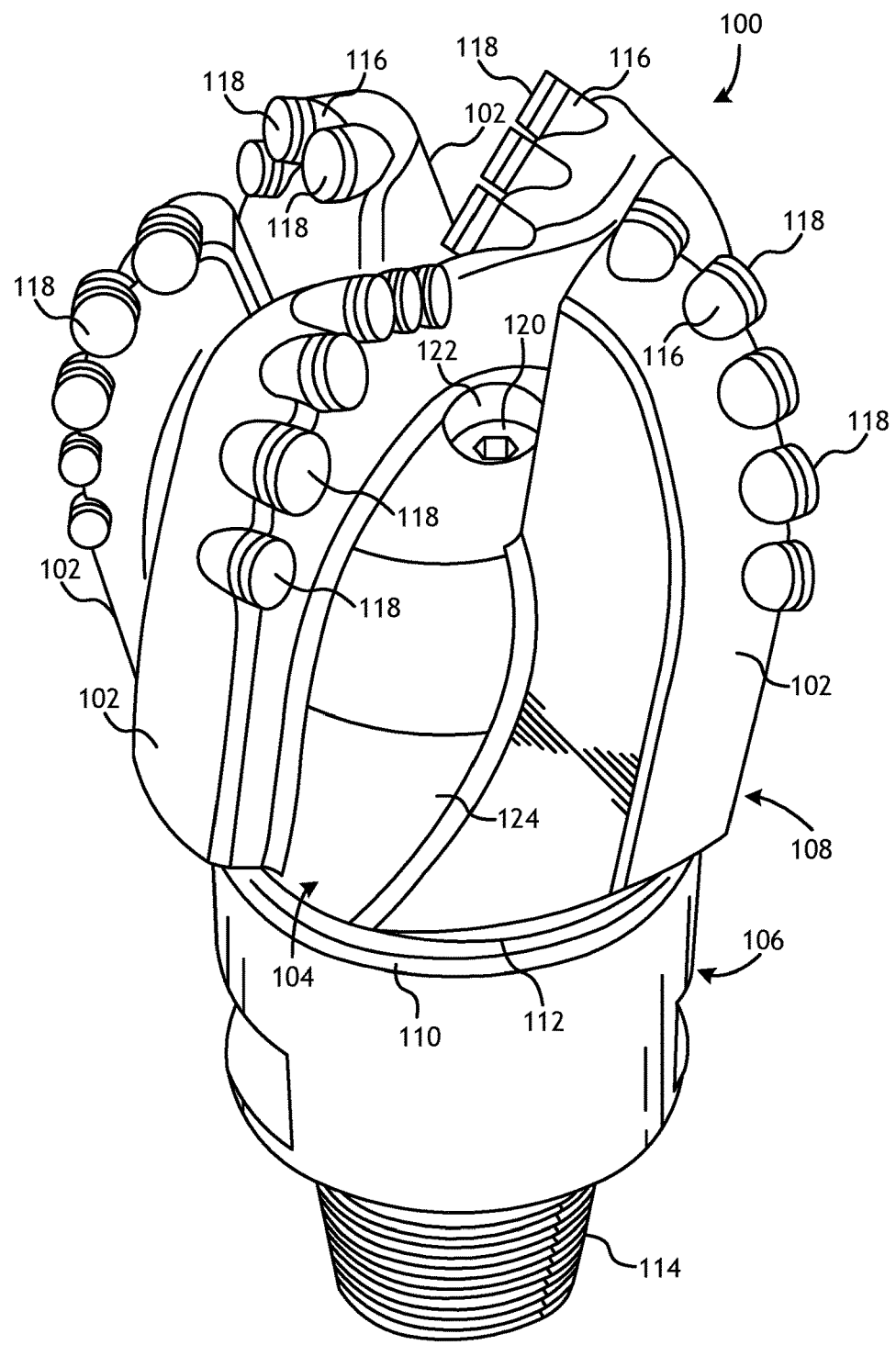
FIG. 1 is a perspective view of an exemplary drill bit that may be fabricated in accordance with the principles of the present disclosure.

Referring to FIG. 1, illustrated is a perspective view of an example MMC tool 100 that may be fabricated in accordance with the principles of the present disclosure. The MMC tool 100 is generally depicted in FIG. 1 as a fixed-cutter drill bit that may be used in the oil and gas industry to drill wellbores. Accordingly, the MMC tool 100 will be referred to herein as "the drill bit 100," but, as indicated above, the drill bit 100 may alternatively be replaced with any type of MMC tool or device used in the oil and gas industry or any other industry, without departing from the scope of the disclosure. Suitable MMC tools used in the oil and gas industry that may be manufactured in accordance with the teachings of the present disclosure include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, sidewall coring tools, fishing spears, washover tools, rotors, stators and/or housings for downhole drilling motors, blades and housings for downhole turbines, and other downhole tools having complex configurations and/or asymmetric geometries associated with forming a wellbore.

As illustrated in FIG. 1, the drill bit 100 may include or otherwise define a plurality of blades 102 arranged along the circumference of a bit head 104. The bit head 104 is connected to a shank 106 to form a bit body 108. The shank 106 may be connected to the bit head 104 by welding, such as using laser arc welding that results in the formation of a weld 110 around a weld groove 112. The shank 106 may further include or otherwise be connected to a threaded pin 114, such as an American Petroleum Institute (API) drill pipe thread.

In the depicted example, the drill bit 100 includes five blades 102 in which multiple recesses or pockets 116 are formed. Cutting elements 118 may be fixedly installed within each recess 116. This can be done, for example, by brazing each cutting element 118 into a corresponding pocket 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
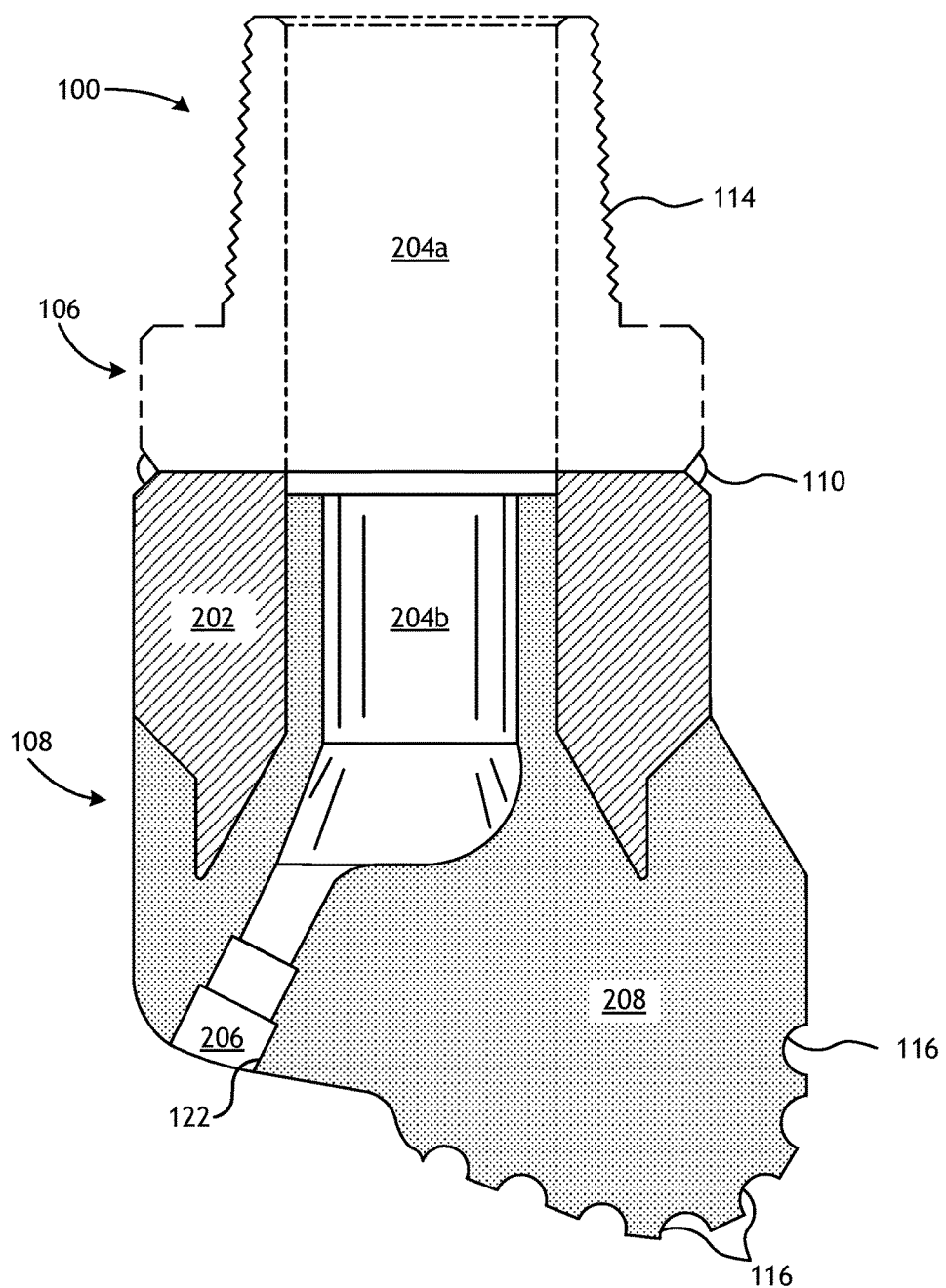
FIG. 2 is a cross-sectional view of the drill bit of FIG. 1.

FIG. 2 is a cross-sectional side view of the drill bit 100 of FIG. 1. Similar numerals from FIG. 1 that are used in FIG. 2 refer to similar components not described again. As illustrated, the shank 106 may be securely attached to a metal blank or mandrel 202 at the weld 110 and the mandrel 202 extends into the bit body 108. The shank 106 and the mandrel 202 are generally cylindrical structures that define corresponding fluid cavities 204a and 204b, respectively, in fluid communication with each other. The fluid cavity 204b of the mandrel 202 may further extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to receive the cutting elements 118 (FIG. 1). The bit body 108 may largely comprise a hard composite portion 208, formed and otherwise fabricated as described herein below.

Figure 3:
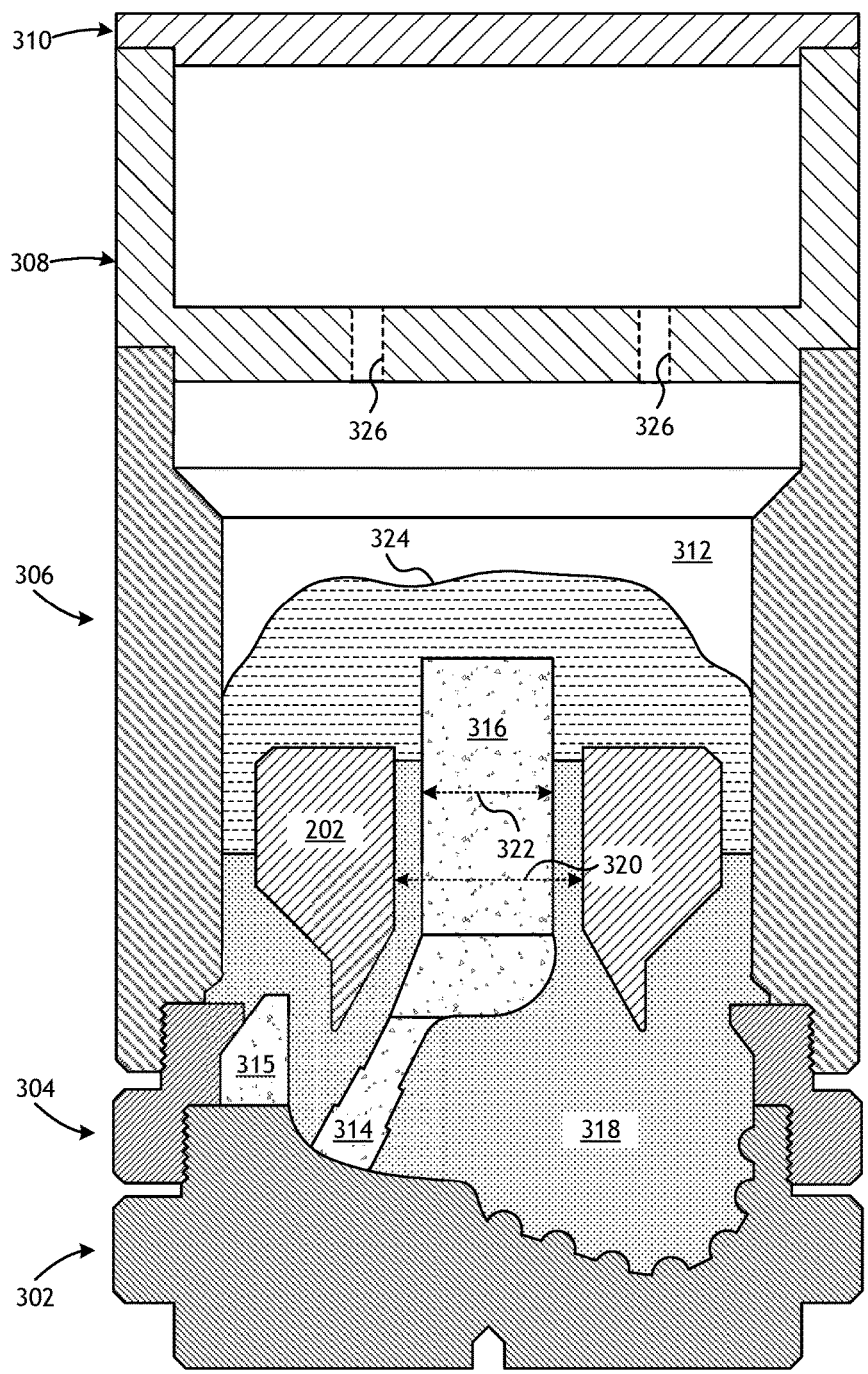
FIG. 3 is a cross-sectional side view of a mold assembly that may be used to fabricate the drill bit of FIGS. 1 and 2.

FIG. 3 is a cross-sectional side view of a mold assembly 300 that may be used to form the drill bit 100 of FIGS. 1 and 2. While the mold assembly 300 is shown and discussed as being used to help fabricate the drill bit 100, those skilled in the art will readily appreciate that variations of the mold assembly 300 may be used to help fabricate any of the infiltrated downhole tools mentioned above, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be directly coupled to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the drill bit 100 (FIGS. 1 and 2).

Materials, such as consolidated sand or graphite, may be positioned within the mold assembly 300 at desired locations to form various features of the drill bit 100 (FIGS. 1 and 2). For example, one or more nozzle displacements 314 (one shown) may be positioned to correspond with desired locations and configurations of the flow passageways 206 (FIG. 2) and their respective nozzle openings 122 (FIGS. 1 and 2). As will be appreciated, the number of nozzle displacements 314 extending from the central displacement 316 will depend upon the desired number of flow passageways and corresponding nozzle openings 122 in the drill bit 100. A cylindrically-shaped central displacement 316 may be placed on the legs 314. Moreover, one or more junk slot displacements 315 (one shown) may also be positioned within the mold assembly 300 to correspond with the junk slots 124 (FIG. 1).

After the desired displacement materials have been suitably installed within the mold assembly 300, reinforcement materials 318 may then be placed within or otherwise introduced into the mold assembly 300. The reinforcement materials 318 may include, for example, various types of reinforcing particles. Suitable reinforcing particles include, but are not limited to, particles of metals, metal alloys, superalloys, intermetallics, borides, carbides, nitrides, oxides, ceramics, diamonds, and the like, or any combination thereof.

Examples of suitable reinforcing particles include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated, such as diamond coated with titanium.

The mandrel 202 may be supported at least partially by the reinforcement materials 318 within the infiltration chamber 312. More particularly, after a sufficient volume of the reinforcement materials 318 has been added to the mold assembly 300, the mandrel 202 may then be placed within mold assembly 300. The mandrel 202 may include an inside diameter 320 that is greater than an outside diameter 322 of the central displacement 316, and various fixtures (not expressly shown) may be used to position the mandrel 202 within the mold assembly 300 at a desired location. The reinforcement materials 318 may then be filled to a desired level within the infiltration chamber 312.

Binder material 324 may then be placed on top of the reinforcement materials 318, the mandrel 202, and the central displacement 316. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of alloys of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling; and any combination thereof.

In some embodiments, the binder material 324 may be covered with a flux layer (not expressly shown). The amount of binder material 324 (and optional flux material) added to the infiltration chamber 312 should be at least enough to infiltrate the reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and subsequently placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 1 and 2). Subsequent machining and post-processing according to well-known techniques may then be used to finish the drill bit 100 (FIG. 1).

According to embodiments of the present disclosure, the drill bit 100, or any of the MMC tools mentioned herein, may be fabricated with a preformed mesh used to add reinforcement to the body of a given MMC tool. More particularly, one or more preformed meshes may be selectively positioned in the infiltration chamber 312 before or while loading the reinforcement materials 318 and prior to infiltration. As described in greater detail below, the preformed mesh provides the given MMC tool with a three-dimensional skeletal structure that reinforces certain portions of the MMC tool, such as the blade regions of an MMC drill bit (e.g., the drill bit 100 of FIG. 1). As will be appreciated, this may allow a user to achieve a desired degree of ductility at the blades (e.g., blades 102 of FIG. 1) and thereby help disperse strain during operation, which may mitigate catastrophic damage. Moreover, the preformed mesh may help arrest crack propagation at key areas within the given MMC tool.

Figure 4A:
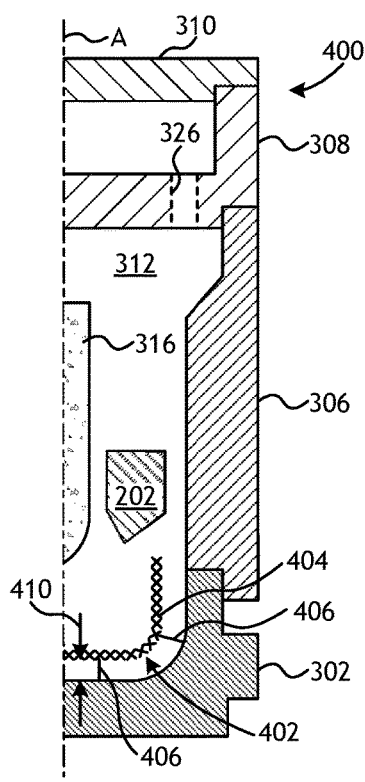
FIGS. 4A and 4B are cross-sectional side views of another exemplary mold assembly and including an exemplary preformed mesh.
Figure 4B:
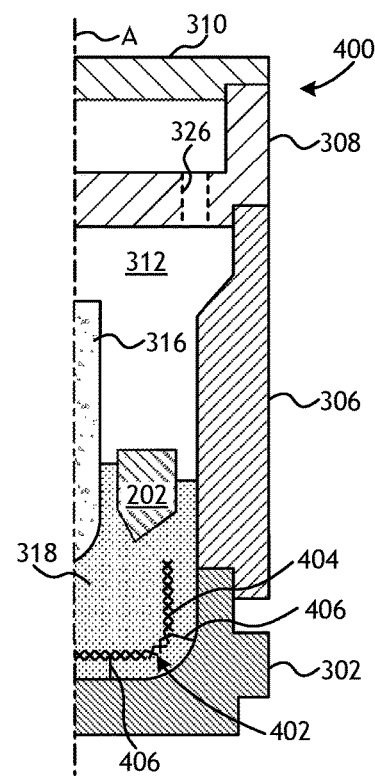
Figure 6:
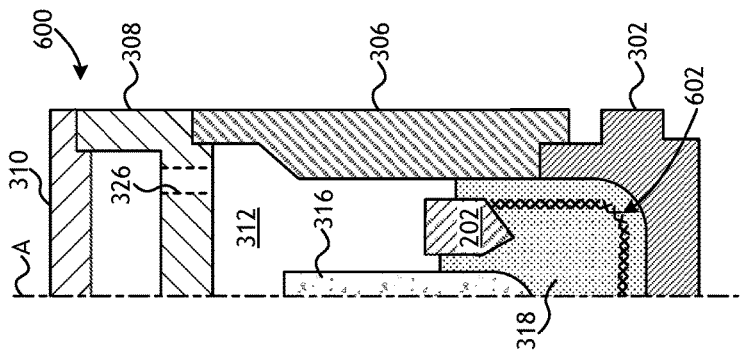
FIG. 6 is a cross-sectional side view of another exemplary mold assembly that includes another exemplary preformed mesh.
Figure 9:
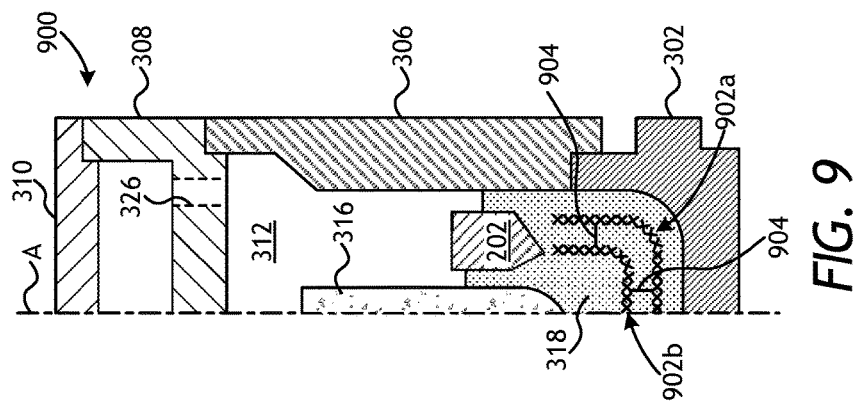
FIG. 9 is a cross-sectional side view of another exemplary mold assembly that includes another exemplary preformed mesh.

Referring now to FIGS. 4A and 4B, with continued reference to FIG. 3, illustrated is a partial cross-sectional side view of an exemplary mold assembly 400, according to one or more embodiments. The mold assembly 400 may be similar in some respects to the mold assembly 300 of FIG. 3 and therefore may be best understood with reference thereto, where like numerals represent like elements not described again in detail. For simplicity, only half of the mold assembly 400 is shown as taken along a longitudinal axis A of the mold assembly 400. The mold assembly 400 and the mold assemblies illustrated in the following successive FIGS. 6, 7A, and 9 are simplified approximations of the mold assembly 300 of FIG. 3 that allow for more simple schematics and straightforward explanations of the various embodiments. Furthermore, due to the asymmetric nature of straight-through cross sections for drill bits with an odd number of blades (FIGS. 1-3), successive cross-sectional figures are restricted to half sections to illustrate simplified generalized configurations that are applicable to drill bits of varying numbers of blades in addition to different portions of drill bits, such as blade sections (e.g., the right half of FIGS. 2-3) and junk-slot sections (e.g., the left half of FIGS. 2-3). It will be appreciated that embodiments illustrated in these half sections may be transferrable from blade regions to junk-slot regions by simply forming holes for positioning around the nozzle displacements 314 (FIG. 3).

Similar to the mold assembly 300 of FIG. 3, the mold assembly 400 may include the mold 302, the funnel 306, the binder bowl 308, and the cap 310. While not shown in FIGS. 4A and 4B, in some embodiments, the gauge ring 304 (FIG. 3) may also be included in the mold assembly 400. Moreover, the mold assembly 400 may further include the mandrel 202, the central displacement 316, and one or more nozzle displacements or legs 314 (FIG. 3), as generally described above.

Unlike the mold assembly 300 of FIG. 3, however, the mold assembly 400 may further include at least one preformed mesh 402 that may be positioned within the infiltration chamber 312 before or while loading the reinforcement materials 318 (FIG. 3). FIG. 4A depicts the mold assembly 400 prior to loading the reinforcement materials into the infiltration chamber 312, and FIG. 4B depicts the mold assembly 400 after the reinforcement materials 318 have been loaded. The preformed mesh 402 may comprise a body 404 that serves as a skeletal reinforcement for the body of the MMC tool being fabricated. In some embodiments, as illustrated, the preformed mesh 402 may include one or more standoffs 406 that extend from the body 404 toward an inner wall of the infiltration chamber 312. These standoffs 406 may stabilize or support the body 404 within the infiltration chamber 312 and allow the body 404 to be generally offset or inset (i.e., radially and/or longitudinally) from the inner wall of the infiltration chamber 312 to a desired offset spacing 410. In some embodiments, the standoffs 406 may support the preformed mesh 402 such that the offset spacing 410 is constant or consistent along all or a portion of the inner wall of the infiltration chamber 312. In other embodiments, however, the offset spacing 410 may vary about the inner wall of the infiltration chamber 312, especially at locations of the blades 102 (FIG. 1) and the junk slots 124 (FIG. 1).

In some embodiments, as illustrated, one or more of the standoffs 406 may comprise rods, pins, posts, or other support members that extend from the body 404 toward the inner wall of the infiltration chamber 312. In other embodiments, as described below, one or more of the standoffs 406 may alternatively comprise longitudinally and/or radially extending fins that extend from the body 404. In either case, the standoffs 406 may either be formed as an integral part of the preformed mesh 402, or may otherwise be coupled to the body 404, such as via tack welds, an adhesive, one or more mechanical fasteners (e.g., screws, bolts, pins, snap rings, etc.), an interference fit, any combination thereof, and the like. In yet other embodiments, the standoffs 406 may be omitted and otherwise not necessary if the preformed mesh 402 is positioned within the infiltration chamber 312 such that it sits on top of a portion of the reinforcement materials 318 or supported by the reinforcement materials 318.

The preformed mesh 402 may comprise any permeable or porous media or material able to bond with the binder material 324 (FIG. 3) during the infiltration process. In some embodiments, the body 404 of the preformed mesh may be fabricated from a plurality of intersecting elongate members (e.g., rods, bars, poles, etc.) that define a plurality of holes or cells. The body 404 may alternatively be fabricated from a foil or plate that is selectively perforated to create the plurality of holes or cells. The size of the holes in the body 404 may be designed to allow a certain level of intermixing of the reinforcement material 318 on either side of the preformed mesh 402 during the loading and compaction processes. For example, the holes in the body 404 may be sized such that the preformed mesh 402 acts as a sieve that allows reinforcing particles of a predetermined size to traverse the preformed mesh 402, while preventing traversal of reinforcing particles greater than the predetermined size. During infiltration, the holes in the body 404 may further allow the binder material 324 to penetrate the preformed mesh 402, thereby being able to infiltrate the reinforcement materials 318 on either side of the preformed mesh 402. The infiltration of the binder material 324 through the porous preformed mesh 402 may prove advantageous in providing increased mechanical interlocking between the regions on either side of the preformed mesh 402.

The preformed mesh 402 may be made of a variety of materials, such as any of the materials listed herein for the reinforcement materials 318 and the binder material 324 (FIG. 3). For instance, the preformed mesh 402 may comprise a metal (i.e., a pure metal), a metal alloy, a superalloy, an intermetallic, a boride, carbides, nitrides, oxides, ceramics, diamonds, metallic foam, and the like, or any combination thereof. Specific candidate materials for the preformed mesh 402 include covalently bonded materials, and refractory and stiff metals, such as beryllium, hafnium, iridium, niobium, osmium, rhenium, rhodium, ruthenium, tantalum, vanadium, nickel, chromium, molybdenum, tungsten, and any combination or alloy thereof between these materials and those previously listed for the binder material 324. As will be appreciated, a hard or stiff material used for the preformed mesh 402 may prove advantageous in providing the MMC tool with high strength reinforcement, which may help areas of a drill bit (e.g., blade regions) increase its rigidity or stiffness.

The preformed mesh 402 may alternatively be made of a ductile material such as, but not limited to, copper, silver, lead, tin, indium, bismuth, lithium, magnesium, silicon, antimony, gold, zinc, and alloys thereof. A ductile material used for the preformed mesh 402 may help with strain dispersion during operation of the MMC tool. More particularly, a ductile material may arrest cracks within the MMC tool by dispersing strain of a propagating crack. As a result, portions of the MMC tool, such as the blades (i.e., the blades 102 of FIG. 1), may have less of a likelihood of catastrophic failure during operation. A crack, caused by high torque or by high weight on the MMC drill bit, may be slowed or stopped entirely by the ductile preformed mesh 402 and would therefore maintain the blade intact.

The preformed mesh 402 may alternatively be made of a material that undergoes an allotropic phase transformation. As an example, zirconia (e.g., zirconium dioxide) undergoes an allotropic phase transformation from tetragonal to monoclinic upon cooling below 1170° C. This transformation causes a large volume expansion that cracks formed components. Certain materials, such as yttrium oxide (yttria), cerium oxide, magnesium oxide, and calcium oxide can be added to zirconia to suppress this phase transformation (e.g., yttria-stabilized zirconia). Then, during use, as cracks form and propagate through and around the preformed mesh 402, the strain field caused by these cracks may cause localized allotropic phase transformations, which increase the volume on a localized scale. This localized expansion may then blunt or stop crack propagation, thereby increasing bit life.

In some embodiments, the preformed mesh 402 may be composed of multiple materials or material types, such that the preformed mesh 402 is made of portions that are stiff and portions that are ductile. Moreover, the standoffs 406 (if used) may comprise one or more different types of materials, such as a material that will dissolve in the binder material 324 during the infiltration process. In other embodiments, however, the standoffs 406 may comprise a material that will not dissolve or is only partially dissolvable in the presence of the binder material 324. In at least one embodiment, the standoffs 406 may be formed of the same material as the hard composite portion 208 (FIG. 2) of the bit body 108 (FIGS. 1 and 2) so as to minimize the amount of unreinforced areas in the resulting MMC tool.

Any of the aforementioned materials and material compositions may be formed, machined, and otherwise manufactured into the desired shape and size for the preformed mesh 402. Suitable techniques for fabricating the preformed mesh 402 include, but are not limited to, additive manufacturing, sintering, powder metallurgy, casting, mechanical weaving, mechanical fastening, tack welding, brazing, laser hole drilling, physical vapor deposition, chemical vapor deposition, sputtering, pulsed laser deposition, chemical solution deposition, plasma enhanced chemical vapor deposition, cathodic arc deposition, electrohydrodynamic deposition (i.e., electrospray deposition), ion-assisted electron-beam deposition, electrolytic plating, electroless plating, thermal evaporation, dipping portions of the preformed mesh 402 in a molten metal bath, and any combination thereof.

In at least one embodiment, all or a portion of the preformed mesh 402 may be manufactured via additive manufacturing, also known as "3D printing." Suitable additive manufacturing techniques that may be used to manufacture or "print" the preformed mesh 402 include, but are not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], fused deposition modeling (FDM), fused filament fabrication (FFF), selective laser sintering (SLS), stereolithography (SL or SLA), laminated object manufacturing (LOM), polyjet, any combination thereof, and the like. In such embodiments, the preformed mesh 402 may be printed using two or more selected materials.

In another embodiment, the preformed mesh 402 may be manufactured and otherwise formed from at least one material after which the preformed mesh 402 may be coated with at least a different material using a suitable coating or deposition process. The resulting manufactured hybrid preformed mesh 402 may provide enhanced properties, such as a stiff core to resist deformation while the coated material provides ductility or adhesion between the preformed mesh 402 and the binder material 324 or reinforcement material 318.

In yet other embodiments, the preformed mesh 402 may be manufactured and otherwise formed from reinforcing particles or a binder material bonded or sintered together with minimal sintering aid or completely encapsulated in a ceramic or organic binder material. In such embodiments, the reinforcing particles may comprise any of the reinforcing particles mentioned herein with respect to the reinforcement materials 318 (FIG. 3) or any of the binder materials mentioned herein with respect to the binder material 324 (FIG. 3), or any combination thereof. During infiltration, the preformed mesh 402 may then become infiltrated by the binder material 324 (FIG. 3) and become a permanent part of the MMC tool (e.g., the drill bit 100 of FIG. 1) or provide an interlocking engagement on either side of the preformed mesh 402.

The preformed mesh 402 can be shaped and otherwise fabricated into a variety of patterns or configurations and placed in various select locations within the infiltration chamber 312 to provide selective reinforcement. One form of the preformed mesh 402, for example, may comprise a drop-in insert configured to fit into a blade cavity within the mold assembly 400. Reinforcement materials 318 may then be loaded into the blade cavity to lock the preformed mesh 402 insert into place. As will be appreciated, preformed mesh 402 inserts may be positioned in some or all of the blade cavities to provide a desired amount of structural reinforcement at the blades (FIG. 1). In other embodiments, the preformed mesh 402 may be constructed in a manner such that it is preformed to fit the entire mold assembly 400, thus providing reinforcement to the blades 102 and the flow passageways 206 (FIG. 2). In such embodiments, the preformed mesh 402 may be positioned in the infiltration chamber 312 prior to securing the displacement legs 314 (FIG. 3).

Figure 5A:
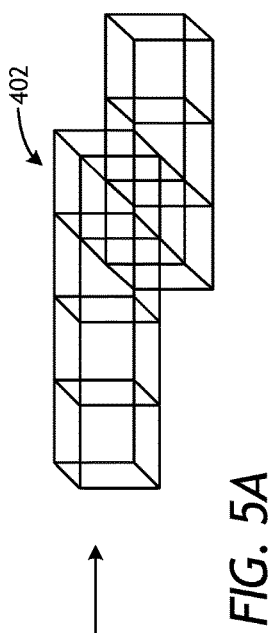
FIGS. 5A and 5B depict exemplary units or elements that may be used to form a preformed mesh.
Figure 5B:
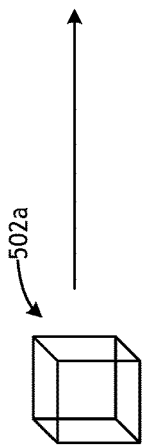

Referring now to FIGS. 5A and 5B, illustrated are exemplary units or elements that may be used to form the preformed mesh 402, according to one or more embodiments of the present disclosure. More particularly, FIG. 5A depicts an isometric view of a first element 502a that may form part of the preformed mesh 402, and FIG. 5B depicts an isometric view of a second element 502b that may form part of the preformed mesh 402. The first element 502a comprises a cubic skeletal structure, and the second element 502b comprises a pyramidal skeletal structure. It will be appreciated, however, that the elements 502a,b may alternatively comprise skeletal structures of any achievable three-dimensional polyhedron such as, but not limited to, fullerene, octahedron, cuboctahedron, rhombicuboctahedron, rhombicosidodecahedron, rhombic triacontahedron, any combination thereof, and the like. Additional acceptable polyhedra include the group of prisms (e.g., triangular prism, pentagonal prism, decagonal prism), the group of truncated polyhedra (e.g., truncated tetrahedron, truncated cube, truncated icosidodecahedron), the group of antiprisms (e.g., square antiprism, hexagonal antiprism, decagonal antiprism, pentagrammic antiprism), the group of uniform star polyhedra with convex faces (e.g., octahemioctahedron, tetrahemihexahedron, great icosahedron), the group of stellated polyhedra (e.g., stellated octahedron, stellated dodecahedron, stellated truncated hexahedron), the group of snub polyhedra (e.g., snub cube, snub dodecahedron), the group on nonconvex polyhedra (e.g., great dodecahemidodecahedron, great icosidodecahedron), any combination thereof, and the like, without departing from the scope of the disclosure. As illustrated in FIGS. 5A and 5B, the individual elements 502a,b may be combined and otherwise conjoined to form the larger preformed mesh 402. In some embodiments, two or more types of elements 502a,b may be used to form the preformed mesh 402.

As a skeletal three-dimensional polyhedron, each element 502a,b may define a plurality of openings or paths extending through the body of the element 502a,b and otherwise between adjacent structural members. In some embodiments, the size of the openings (e.g., diameter, length, width, etc.) may be controlled to work as a sieve for certain particle sizes of the reinforcement materials 318 (FIGS. 4A and 4B). For instance, a preformed mesh 402 may be configured to be offset from the inner wall of the infiltration chamber 312 a short distance and may define openings sized to retain large particles of the reinforcement materials 318 at or near the walls of the infiltration chamber 312, while simultaneously allowing smaller particles to traverse the preformed mesh 402 and migrate toward the core of the MMC tool. As will be appreciated, this may prove advantageous for erosion resistance in the MMC tool since the larger particles will be retained near the periphery of the MMC tool following infiltration. In other embodiments, the size of the openings may be large enough to allow free flow of all particle sizes of the reinforcement materials 318 across the preformed mesh 402. In yet other embodiments, the openings may be customized based on foreseeable location placement within the MMC tool (i.e., within the infiltration chamber 312 of FIGS. 4A and 4B).

Since the preformed mesh 402 can be made of a plurality of the elements 502a,b, the preformed mesh 402 may be modular in that a desired shape for the preformed mesh 402 may be selected and then individual elements 502a,b may be sequentially added to complete the shape, not unlike children's building blocks. The elements 502a,b may interconnect to maintain their relative placement until the reinforcement materials 318 (FIGS. 4A and 4B) are loaded into the infiltration cavity 312 (FIGS. 4A and 4B), which then locks the elements 502a,b in place for infiltration. As a result, the preformed mesh 402 may be built to fit desired locations within the mold assembly 400 (FIGS. 4A and 4B), and thereby provide reinforcement to an MMC tool at a high level of customization.

Referring now to FIG. 6, with continued reference to FIGS. 4A and 4B, illustrated is a partial cross-sectional side view of another exemplary mold assembly 600, according to one or more embodiments. The mold assembly 600 may be similar in some respects to the mold assembly 400 of FIGS. 4A and 4B and therefore may be best understood with reference thereto, where like numerals represent like elements that will not be described again. The mold assembly 600 may include a preformed mesh 602 that may be similar in some respects to the preformed mesh 402 of FIGS. 4A and 4B, such as being made of similar materials and fabricated via any of the aforementioned processes and methods.

Unlike the preformed mesh 402, however, the preformed mesh 602 does not include the standoffs 406. Rather, the preformed mesh 602 may alternatively be suspended within the infiltration chamber 312. In some embodiments, for instance, the preformed mesh 602 may be coupled to the mandrel 202 such as via tack welds, an adhesive, one or more mechanical fasteners (e.g., screws, bolts, pins, snap rings, etc.), an interference fit, any combination thereof, and the like. In other embodiments, however, a portion of the reinforcement materials 318 may be loaded into the infiltration chamber 312 to a desired depth and the preformed mesh 602 may then be placed on the loaded reinforcement materials 318 and the remaining reinforcement materials 318 may subsequently be loaded on top of the preformed mesh. In yet other embodiments, the preformed mesh 602 may alternatively be coupled to a feature disposed above or around the mandrel 202, such as a centering fixture (not shown) used only during the loading process. Once the loading process is complete, and prior to the infiltration process, the centering fixture would be removed from the mold assembly 600.

FIGS. 7A and 7B depict another exemplary mold assembly 700, according to one or more embodiments. More particularly, FIG. 7A illustrates a partial cross-sectional side view of the mold assembly 700, and FIG. 7B illustrates a cross-sectional top view of the mold assembly 700 as taken along the indicated lines in FIG. 7A. The mold assembly 700 may be similar in some respects to the mold assembly 400 of FIGS. 4A and 4B and therefore may be best understood with reference thereto, where like numerals represent like elements that will not be described again. The mold assembly 700 may include a preformed mesh 702 that may be similar in some respects to the preformed mesh 402 of FIGS. 4A and 4B, such as being made of similar materials and fabricated via any of the aforementioned processes and methods.

Moreover, similar to the preformed mesh 402, the preformed mesh 702 may include a body 704 and one or more standoffs 706 that extend from the body 704 toward an inner wall of the infiltration chamber 312. The standoffs 706 may stabilize or support the body 704 within the infiltration chamber 312 and allow the body 704 to be generally offset or inset (i.e., radially and/or longitudinally) from the inner wall of the infiltration chamber 312. Unlike the preformed mesh 402, however, one or more of the standoffs 706 of the preformed mesh 702 may comprise a vertically-disposed fin or plate that extends longitudinally along a portion of the body 704 toward the inner wall of the infiltration chamber 312. The standoffs 706 may either be formed as an integral part of the preformed mesh 702, or otherwise may be coupled to the body 704, such as via tack welds, an adhesive, one or more mechanical fasteners (e.g., screws, bolts, pins, snap rings, etc.), an interference fit, any combination thereof, and the like. In the illustrated embodiment, the fin-shaped standoffs 706 may extend longitudinally along the body 704 to an intermediate point.

While the standoffs 706 are depicted in FIG. 7A as being positioned at a particular location, it will be appreciated that the location of the standoffs 706 may vary, depending on the application. In some embodiments, for instance, one or more of the standoffs 706 may extend longitudinally along the body 704 almost to the longitudinal axis A. In other embodiments, one or more of the standoffs 706 may extend longitudinally along the body 704 and otherwise be discretely located at or near the longitudinal axis A. In yet other embodiments, one of more of the standoffs 706 may extend longitudinally along the body 704 at two or more discrete locations. For instance, some of the standoffs 706 may extend from the body 704 and longitudinally along the inner wall of the infiltration chamber 312 to an intermediate point, and other standoffs 706 may be located at or near the longitudinal axis A.

As shown in FIG. 7B, the preformed mesh 702 may include a plurality of standoffs 706 (six shown) extending radially from the body 704. Some of the standoffs 706 may be fin-shaped, as described above, while others may be simple support members, such as rods, pins, or posts that extend toward the inner wall of the infiltration chamber 312. A potential embodiment for the cross-section shown in FIG. 7B could be a six-bladed bit wherein the six standoffs 706 correspond to either the six junk slots 124 (FIG. 1) or the six blades 102 (FIG. 1). As will be appreciated, more or less than six standoffs 706 may be employed, without departing from the scope of the disclosure. Moreover, while the standoffs 706 are depicted in FIG. 7B as being equidistantly spaced from each other about the circumference of the body 704, the standoffs 706 may alternatively be spaced randomly from each other.

In the illustrated embodiment, the body 704 is depicted as exhibiting a generally circular cross-sectional shape. It will be appreciated, however, that the body 704 may alternatively exhibit various other cross-sectional shapes, such as oval, polygonal (e.g., triangular, square, pentagonal, hexagonal, etc.), elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices. In other embodiments, the cross-sectional shape of the body 704 may be modified to conform to the shape of the blades 102 (FIG. 1), for example, such as having a constant offset spacing from the outer surface of the MMC tool (e.g., the drill bit 100 of FIGS. 1 and 2). In such embodiments, the cross-sectional shape of the body 704 may be in the general shape of a gear, as described below with reference to FIG. 8B.

In yet other embodiments, the cross-sectional shape of the body 704 may include patterned or varied undulations or other similar structures defined about its circumference. As will be appreciated, an undulating or variable outer circumference for the body 704 may prove advantageous in increasing surface area between the opposing sides of the preformed mesh 702, and increasing the surface area may promote adhesion and enhance shearing strength between the regions on either side of the preformed mesh 702.

FIGS. 8A and 8B depict cross-sectional top views of exemplary preformed meshes 802a and 802b that may be used in any of the mold assemblies described herein. As illustrated, the preformed meshes 802a,b may each include a body 804. In FIG. 8A, the body 804 of the first preformed mesh 802a may exhibit a cross-sectional shape that comprises undulations about its circumference. In other embodiments, the undulations may be squared off crenulations, without departing from the scope of the disclosure. Moreover, the first preformed mesh 802a may include four standoffs 806 that are equidistantly spaced from each other about the circumference of the body 804, but could equally include more or less than four standoffs 806 that may alternatively be spaced randomly from each other. The standoffs 806 may be fin-shaped or rod-like standoffs, as generally described herein.

In FIG. 8B, the body 804 of the second preformed mesh 802b may exhibit a cross-sectional shape in the general form of a gear. More particularly, the body 804 may provide or otherwise define a plurality of lobes 808, and each lobe 808 may be configured to be positioned within and otherwise correspond with a corresponding blade 102 (FIG. 1). In FIG. 8B, the standoffs 806 may be omitted or positioned at other locations as needed to help maintain the preformed mesh 802b offset from the inner wall of the infiltration chamber 312 (FIG. 3).

In some embodiments, the second preformed mesh 802b may further include one or more preformed mesh inserts 810 positioned at select locations within the infiltration chamber. The preformed mesh inserts 810 may be made of any of the materials and via any of the process described herein with reference to any of the preformed meshes. In the illustrated embodiment, the preformed mesh inserts 810 are depicted as being placed within the lobes 808, or the region where corresponding blades 102 (FIG. 1) will subsequently be formed. The preformed mesh inserts 810 may extend longitudinally along all or a portion of the region for the blade 102 such that localized reinforcement can be provided at those locations. Moreover, the preformed mesh inserts 810 may be used in conjunction with any of the preformed meshes described herein, or independently. Accordingly, in at least one embodiment, body 804 may be omitted from the second preformed mesh 802b, and the preformed mesh inserts 810 may comprise the only component parts of the second preformed mesh 802b.

While depicted in FIG. 8B as exhibiting a generally circular cross-sectional shape, the preformed mesh inserts 810 may alternatively exhibit a different cross-sectional shape, such as oval, elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices, and any combination thereof. As will be appreciated, the cross-sectional shape of the preformed mesh inserts 810 may depend, at least in part, on the geometrical design of the MMC tool.

Referring now to FIG. 9, illustrated is a cross-sectional side view of another exemplary mold assembly 900, according to one or more embodiments. The mold assembly 900 may be similar in some respects to the mold assembly 400 of FIGS. 4A and 4B and therefore may be best understood with reference thereto, where like numerals represent like elements not described again. Unlike the mold assembly 400, however, the mold assembly 900 may include two or more preformed meshes, shown as a first preformed mesh 902a and a second preformed mesh 902b positioned within the infiltration chamber 312 and offset from each other (i.e., radially and/or longitudinally) in a nested relationship. The first and second preformed meshes 902a,b may be similar to the preformed mesh 402 of FIGS. A and 4B, such as being made of similar materials and fabricated via any of the aforementioned processes and methods. While only two preformed meshes 902a,b are depicted in FIG. 9, it will be appreciated that more than two may be employed, without departing from the scope of the disclosure.

In some embodiments, one or more standoffs 904 may separate the first and second preformed meshes 902a,b within the infiltration chamber 312. While not shown, one or more addition standoffs may be used to support the first preformed mesh 902a within the infiltration chamber 312. In other embodiments, one or both of the preformed meshes 902a,b may alternatively be coupled to a feature disposed above or around the mandrel 202, such as a centering fixture (not shown) used only during the loading process. In yet other embodiments, the reinforcement materials 318 may be sequentially loaded with the first and second preformed meshes 902a,b, thereby allowing the preformed meshes 902a,b to be supported at least partially by the reinforcement material 318.

In at least one embodiment, the first and second preformed meshes 902a,b may comprise different materials. For example, the first mesh preform 902a may be made of a stiffer material, while the second mesh preform 902b may be made of a more ductile material. As will be appreciated, this may prove advantageous in providing the MMC tool with more rigidity at or near its periphery following infiltration, and simultaneously providing more ductile reinforcement at its center or core. In other embodiments, however, the first and second preformed meshes 902a,b may each be made of a stiff material while the standoffs 904 may be made of a ductile material. In such embodiments, the resulting MMC tool following infiltration may have stiff reinforcement in certain directions, while the use of the ductile standoffs 904 can produce or enhance precise positioning and/or create a coupling between the stiff reinforcement members.

Figure 10B:
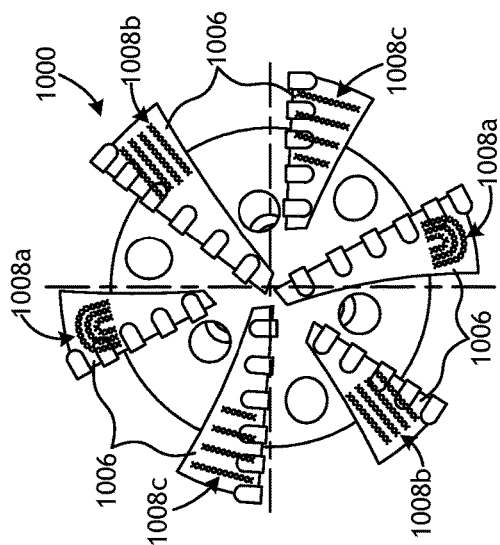
FIGS. 10A and 10B are apex-end views of an exemplary drill bit having respective exemplary preformed meshes schematically overlaid thereon.
Figure 10A:
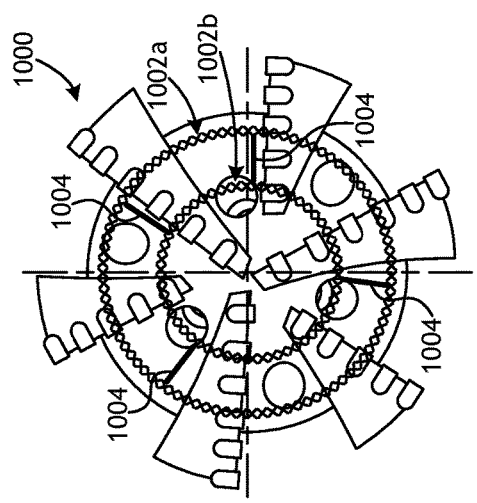

Referring now to FIGS. 10A and 10B, illustrated are apex-end views of a drill bit 1000 having respective exemplary preformed mesh cross sections schematically overlaid thereon, according to one or more embodiments. In FIG. 10A, the drill bit 1000 may have nested first and second preformed meshes 1002a and 1002b, similar to the preformed meshes 902a,b of FIG. 9. Again, while only two preformed meshes 1002a,b are depicted in FIG. 10A, it will be appreciated that more than two may be employed, without departing from the scope of the disclosure.

In some embodiments, one or more standoffs 1004 may extend between the first and second preformed meshes 1002a,b and otherwise serve to maintain the preformed meshes 1002a,b offset from each other. Some of the standoffs 1004 may be vertically-disposed fins, as described above, while others may be simple support members, such as rods, pins, or posts that extend between the first and second preformed meshes 1002a,b. Alternatively or in addition thereto, the one or more of the standoffs 1004 may extend from the inner wall of the infiltration chamber 312 (FIG. 3) and provide support to the first preformed mesh 1002a. Moreover, it should be noted that the standoffs 1004 are depicted in FIG. 10A as being irregularly spaced from each other and otherwise not aligned with the blades of drill bit 1000. In other embodiments, however, the standoffs 1004 may be equidistantly spaced from each other and/or aligned with the blades, without departing from the scope of the disclosure.

While each preformed mesh 1002a,b is depicted as exhibiting a generally circular cross-sectional shape, it will be appreciated that either of the preformed meshes 1002a,b may alternatively exhibit other cross-sectional shapes, such as elliptical, regular polygonal (e.g., triangular, square, pentagonal, hexagonal, etc.), irregular polygon, undulating, gear-shaped, or any combination thereof, including asymmetric geometries, sharp corners, rounded or filleted vertices, and chamfered vertices, without departing from the scope of the disclosure. Moreover, it will be appreciated that the cross-sectional shape of either of the preformed meshes 1002a,b may vary along the height of the drill bit 1000 and may otherwise include a plurality of the above cross-sectional shapes, in keeping with the present disclosure.

FIG. 10B depicts several different configurations of preformed meshes as positioned within the several blades 1006 of the drill bit 1000. In some blades 1006, for example, one or more preformed meshes 1008a may generally follow the contour of the blades and otherwise curve inside the blade 1006. In cases where there are more than one, the preformed meshes 1008a may be situated in a nested relationship. In other blades 1006, one or more additional preformed meshes 1008b may be generally flat and extend parallel to the angle of the corresponding blades 1006. In yet other blades 1006, one or more other preformed meshes 1008c may be generally flat and extend perpendicular to the angle of the corresponding blades 1006. As will be appreciated, preformed meshes may alternatively extend at any angle between parallel and perpendicular to the angle of the blade 1006, or any angle between perpendicular to the cross section (as shown in FIG. 10B) and parallel to the cross section, or any combination thereof, or they might be contoured to follow the profile of a key feature in the MMC tool, such as extending around the nozzle displacements 314 (FIG. 3). The preformed meshes 1008a-c may be of any thickness and varying thicknesses to optimize reinforcement properties and/or characteristics in key directions for the resulting MMC tool.

Embodiments disclosed herein include:

A. A mold assembly system that includes a mold assembly that defines an infiltration chamber used for forming an infiltrated metal-matrix composite (MMC) tool, reinforcement materials deposited within the infiltration chamber, a binder material that infiltrates the reinforcement materials, and at least one preformed mesh positioned within the infiltration chamber and embedded within the reinforcement materials, the at least one preformed mesh including a porous body and providing skeletal reinforcement to the infiltrated MMC tool following infiltration.

B. A method for fabricating an infiltrated metal-matrix composite (MMC) tool, the method including positioning at least one preformed mesh within an infiltration chamber of a mold assembly, the at least one preformed mesh including a porous body, depositing reinforcement materials into the infiltration chamber and thereby embedding the at least one preformed mesh in the reinforcement materials, infiltrating the reinforcement materials with a binder material and thereby providing the infiltrated MMC tool, and structurally reinforcing the infiltrated MMC tool with the at least one preformed mesh.

Each of embodiments A and B may have one or more of the following additional elements in any combination: Element 1: wherein the infiltrated MMC tool is a tool selected from the group consisting of oilfield drill bits or cutting tools, non-retrievable drilling components, aluminum drill bit bodies associated with casing drilling of wellbores, drill-string stabilizers, a cone for roller-cone drill bits, a model for forging dies used to fabricate support arms for roller-cone drill bits, an arm for fixed reamers, an arm for expandable reamers, an internal component associated with expandable reamers, a sleeve attachable to an uphole end of a rotary drill bit, a rotary steering tool, a logging-while-drilling tool, a measurement-while-drilling tool, a side-wall coring tool, a fishing spear, a washover tool, a rotor, a stator and/or housing for downhole drilling motors, blades for downhole turbines, and any combination thereof. Element 2: wherein the at least one preformed mesh further includes one or more standoffs that extend from the porous body toward an inner wall of the infiltration chamber, and wherein the one or more standoffs engage the inner wall of the infiltration chamber and provide an offset spacing between the porous body and the inner wall of the infiltration chamber. Element 3: wherein the offset spacing varies along all or a portion of the inner wall of the infiltration chamber. Element 4: wherein the one or more standoffs comprise a structure selected from the group consisting of a rod, a pin, a post, a vertically-disposed fin, a horizontally-disposed plate, any combination thereof, and the like. Element 5: wherein the porous body exhibits a cross-sectional shape selected from the group consisting of circular, oval, undulating, gear-shaped, elliptical, regular polygonal, irregular polygon, undulating, crenelated, crenelated with sharp corners, crenelated with rounded corners, asymmetric geometries, and any combination thereof. Element 6: wherein the at least one preformed mesh is suspended within the infiltration chamber. Element 7: wherein the at least one preformed mesh comprises a material selected from the group consisting of a metal, a metal alloy, a superalloy, an intermetallic, a boride, a carbide, a nitride, an oxide, a ceramic, diamond, metallic foam, and any combination thereof. Element 8: wherein the metal comprises a stiff metal selected from the group consisting of beryllium, hafnium, iridium, niobium, osmium, rhenium, rhodium, ruthenium, tantalum, vanadium, nickel, chromium, molybdenum, tungsten, any combination thereof, and any alloy of the preceding with the binder material. Element 9: wherein the metal comprises a ductile metal selected from the group consisting of copper, silver, lead, tin, indium, bismuth, lithium, magnesium, silicon, antimony, gold, zinc, and any alloy thereof. Element 10: wherein the at least one preformed mesh comprises two or more of the materials. Element 11: wherein the at least one preformed mesh is fabricated using at least one of additive manufacturing, sintering, powder metallurgy, casting, mechanical weaving, mechanical fastening, tack welding, brazing, laser hole drilling, physical vapor deposition, chemical vapor deposition, sputtering, pulsed laser deposition, chemical solution deposition, plasma enhanced chemical vapor deposition, cathodic arc deposition, electrohydrodynamic deposition, ion-assisted electron-beam deposition, electrolytic plating, electroless plating, thermal evaporation, dipping portions of the preformed mesh in a molten metal bath, and any combination thereof. Element 12: wherein the at least one preformed mesh comprises one or more inserts positioned at select locations within the infiltration chamber. Element 13: wherein the at least one preformed mesh comprises a plurality of three-dimensional, polyhedron skeletal elements conjoined to form the at least one preformed mesh. Element 14: wherein the at least one preformed mesh comprises a first preformed mesh and a second preformed mesh each positioned within the infiltration chamber and offset from each other in a nested relationship. Element 15: further comprising one or more standoffs extending between the first and second preformed meshes. Element 16: wherein the first and second preformed meshes comprise different materials. Element 17: wherein the infiltrated MMC tool is a drill bit having a plurality of blades and the at least one preformed mesh comprises one or more preformed meshes that follow a contour of one of the plurality of blades. Element 18: wherein the infiltrated MMC tool is a drill bit having a plurality of blades and the at least one preformed mesh comprises one or more preformed meshes that extend parallel to an angle of one of the plurality of blades, perpendicular to the angle of one of the plurality of blades, or at an angle between parallel and perpendicular to the angle of one of the plurality of blades.

Element 19: wherein the at least one preformed mesh further includes one or more standoffs that extend from the porous body toward an inner wall of the infiltration chamber, and wherein positioning the at least one preformed mesh within the infiltration chamber comprises engaging the inner wall of the infiltration chamber with the one or more standoffs, and provide an offset spacing between the body and the inner wall of the infiltration chamber with the one or more standoffs. Element 20: wherein positioning the at least one preformed mesh within the infiltration chamber comprises suspending the at least one preformed mesh within the infiltration chamber. Element 21: wherein the at least one preformed mesh comprises a material selected from the group consisting of a metal, a metal alloy, a superalloy, an intermetallic, a boride, a carbide, a nitride, an oxide, a ceramic, diamond, metallic foam, and any combination thereof. Element 22: wherein the metal comprises a stiff metal selected from the group consisting of beryllium, hafnium, iridium, niobium, osmium, rhenium, rhodium, ruthenium, tantalum, vanadium, nickel, chromium, molybdenum, tungsten, any combination thereof, and any alloy of the preceding with the binder material. Element 23: wherein the at least one preformed mesh comprises one or more inserts and wherein positioning the at least one preformed mesh within the infiltration chamber comprises positioning the one or more inserts at select locations within the infiltration chamber. Element 24: wherein the at least one preformed mesh comprises a first preformed mesh and a second preformed mesh and wherein positioning the at least one preformed mesh within the infiltration chamber comprises positioning the first and second preformed meshes within the infiltration chamber offset from each other and in a nested relationship. Element 25: wherein the first and second preformed meshes comprise different materials and wherein structurally reinforcing the infiltrated MMC tool with the at least one preformed mesh comprises reinforcing the infiltrated MMC tool with rigidity using the first preformed mesh, and reinforcing the infiltrated MMC tool with ductility using the second preformed mesh. Element 26: wherein the infiltrated MMC tool is a drill bit having a plurality of blades and the at least one preformed mesh comprises one or more preformed meshes, and wherein positioning the one or more preformed meshes in a corresponding one or more blade cavities defined in the mold assembly.

By way of non-limiting example, exemplary combinations applicable to A, B, and C include: Element 2 with Element 3; Element 2 with Element 4; Element 7 with Element 8; Element 7 with Element 9; Element 7 with Element 10; Element 14 with Element 15; Element 14 with Element 16; and Element 24 with Element 25.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:
1. A mold assembly system, comprising:
a mold assembly that defines an infiltration chamber used for forming an infiltrated metal-matrix composite (MMC) tool;
reinforcement materials deposited within the infiltration chamber;

a binder material that infiltrates the reinforcement materials; and at least one preformed mesh positioned within the infiltration chamber and embedded within the reinforcement materials, the at least one preformed mesh including a porous body forming a three-dimensional skeletal structure, wherein a plurality of three-dimensional, polyhedron skeletal elements are conjoined to form the three-dimensional skeletal structure, the at least one preformed mesh providing skeletal reinforcement to the infiltrated MMC tool following infiltration.

2. The mold assembly system of claim 1, wherein the infiltrated MMC tool is a tool selected from the group consisting of oilfield drill bits or cutting tools, non-retrievable drilling components, aluminum drill bit bodies associated with casing drilling of wellbores, drill-string stabilizers, a cone for roller-cone drill bits, a model for forging dies used to fabricate support arms for roller-cone drill bits, an arm for fixed reamers, an arm for expandable reamers, an internal component associated with expandable reamers, a sleeve attachable to an uphole end of a rotary drill bit, a rotary steering tool, a logging-while-drilling tool, a measurement-while-drilling tool, a side-wall coring tool, a fishing spear, a washover tool, a rotor, a stator and/or housing for downhole drilling motors, blades for downhole turbines, and any combination thereof.

3. The mold assembly system of claim 1, wherein the at least one preformed mesh further includes one or more standoffs that extend from the porous body toward an inner wall of the infiltration chamber, and wherein the one or more standoffs engage the inner wall of the infiltration chamber and provide an offset spacing between the porous body and the inner wall of the infiltration chamber.

4. The mold assembly system of claim 3, wherein the offset spacing varies along all or a portion of the inner wall of the infiltration chamber.

5. The mold assembly system of claim 3, wherein the one or more standoffs comprise a structure selected from the group consisting of a rod, a pin, a post, a vertically-disposed fin, a horizontally-disposed plate, and any combination thereof.

6. The mold assembly system of claim 1, wherein the porous body exhibits a cross-sectional shape selected from the group consisting of circular, oval, undulating, gear-shaped, elliptical, regular polygonal, irregular polygon, undulating, crenelated, crenelated with sharp corners, crenelated with rounded corners, asymmetric geometries, and any combination thereof.

7. The mold assembly system of claim 1, wherein the at least one preformed mesh comprises a material selected from the group consisting of a metal, a metal alloy, a superalloy, an intermetallic, a boride, a carbide, a nitride, an oxide, a ceramic, diamond, metallic foam, and any combination thereof.

8. The mold assembly system of claim 7, wherein the metal comprises a stiff metal selected from the group consisting of beryllium, hafnium, iridium, niobium, osmium, rhenium, rhodium, ruthenium, tantalum, vanadium, nickel, chromium, molybdenum, tungsten, any combination thereof, and any alloy of the preceding with the binder material.

9. The mold assembly system of claim 7, wherein the metal comprises a ductile metal selected from the group consisting of copper, silver, lead, tin, indium, bismuth, lithium, magnesium, silicon, antimony, gold, zinc, and any alloy thereof.

10. The mold assembly system of claim 7, wherein the at least one preformed mesh comprises two or more of the materials.

11. The mold assembly system of claim 1, wherein the at least one preformed mesh is fabricated using at least one of additive manufacturing, sintering, powder metallurgy, casting, mechanical weaving, mechanical fastening, tack welding, brazing, laser hole drilling, physical vapor deposition, chemical vapor deposition, sputtering, pulsed laser deposition, chemical solution deposition, plasma enhanced chemical vapor deposition, cathodic arc deposition, electrohydrodynamic deposition, ion-assisted electron-beam deposition, electrolytic plating, electroless plating, thermal evaporation, dipping portions of the preformed mesh in a molten metal bath, and any combination thereof.

12. The mold assembly system of claim 1, wherein the at least one preformed mesh comprises one or more inserts positioned at select locations within the infiltration chamber.

13. The mold assembly system of claim 1, wherein the at least one preformed mesh comprises a first preformed mesh and a second preformed mesh each positioned within the infiltration chamber and offset from each other in a nested relationship.

14. The mold assembly system of claim 13, further comprising one or more standoffs extending between the first and second preformed meshes.

15. The mold assembly system of claim 13, wherein the first and second preformed meshes comprise different materials.

16. The mold assembly system of claim 1, wherein the infiltrated MMC tool is a drill bit having a plurality of blades and the at least one preformed mesh comprises one or more preformed meshes that follow a contour of one of the plurality of blades.

17. The mold assembly system of claim 1, wherein the infiltrated MMC tool is a drill bit having a plurality of blades and the at least one preformed mesh comprises one or more preformed meshes that extend parallel to an angle of one of the plurality of blades, perpendicular to the angle of one of the plurality of blades, or at an angle between parallel and perpendicular to the angle of one of the plurality of blades.

18. A method for fabricating an infiltrated metal-matrix composite (MMC) tool, comprising:
    positioning at least one preformed mesh within an infiltration chamber of a mold assembly, the at least one preformed mesh including a porous body;
    depositing reinforcement materials into the infiltration chamber and thereby embedding the at least one preformed mesh in the reinforcement materials;
    infiltrating the reinforcement materials with a binder material after positioning the at least one preformed mesh within the infiltration chamber, and thereby providing the infiltrated MMC tool; and
    structurally reinforcing the infiltrated MMC tool with the at least one preformed mesh.

19. The method of claim 18, wherein the at least one preformed mesh further includes one or more standoffs that extend from the porous body toward an inner wall of the infiltration chamber, and wherein positioning the at least one preformed mesh within the infiltration chamber comprises:
    engaging the inner wall of the infiltration chamber with the one or more standoffs; and
    provide an offset spacing between the body and the inner wall of the infiltration chamber with the one or more standoffs.

20. The method of claim 18, wherein positioning the at least one preformed mesh within the infiltration chamber comprises suspending the at least one preformed mesh within the infiltration chamber.

21. The method of claim 18, wherein the at least one preformed mesh comprises a material selected from the group consisting of a metal, a metal alloy, a superalloy, an intermetallic, a boride, a carbide, a nitride, an oxide, a ceramic, diamond, metallic foam, and any combination thereof.

22. The method of claim 18, wherein the metal comprises a stiff metal selected from the group consisting of beryllium, hafnium, iridium, niobium, osmium, rhenium, rhodium, ruthenium, tantalum, vanadium, nickel, chromium, molybdenum, tungsten, any combination thereof, and any alloy of the preceding with the binder material.

23. The method of claim 18, wherein the at least one preformed mesh comprises one or more inserts and wherein positioning the at least one preformed mesh within the infiltration chamber comprises positioning the one or more inserts at select locations within the infiltration chamber.

24. The method of claim 18, wherein the at least one preformed mesh comprises a first preformed mesh and a second preformed mesh and wherein positioning the at least one preformed mesh within the infiltration chamber comprises positioning the first and second preformed meshes within the infiltration chamber offset from each other and in a nested relationship.

25. The method of claim 24, wherein the first and second preformed meshes comprise different materials and wherein structurally reinforcing the infiltrated MMC tool with the at least one preformed mesh comprises:
   reinforcing the infiltrated MMC tool with rigidity using the first preformed mesh; and
   reinforcing the infiltrated MMC tool with ductility using the second preformed mesh.

26. The method of claim 18, wherein the infiltrated MMC tool is a drill bit having a plurality of blades and the at least one preformed mesh comprises one or more preformed meshes, and wherein positioning the at least one preformed mesh within the infiltration chamber comprises positioning the one or more preformed meshes in a corresponding one or more blade cavities defined in the mold assembly.

* * * * *